Oct. 20, 1964    F. KUYT ETAL    3,153,690
FOCUSING TELESCOPE
Filed March 27, 1961

FRITS KUYT
EUGENE L. TURNER
*INVENTORS*

BY *Frank C. Parker*

*ATTORNEY*

3,153,690
FOCUSING TELESCOPE
Frits Kuyt, Rochester, and Eugene L. Turner, Brighton, N.Y., assignors to Bausch & Lomb Incorporated, Rochester, N.Y., a corporation of New York
Filed Mar. 27, 1961, Ser. No. 98,606
2 Claims. (Cl. 88—32)

The present invention relates to improvements in telescopes and particularly it relates to those improvements which are obtainable by the use of molded structures.

It is an object of this invention to provide a telescope which is constructed by molding techniques resulting in low cost and rugged construction of such a nature that good alignment of the optical parts of the telescope is assured during the life of the instrument.

Another object is to provide such a device having novel means for mounting a compound uncemented lens member in a quick, simple and reliable manner so that all of the elements thereof are in excellent optical alignment with each other and are dependably secured.

A further object is to provide a telescope having such integral mounting means for an uncemented compound lens member therein that the mounting holds said member firmly without inducing deleterious mechanical strains in the glass, the hold on the lens member remaining secure in spite of vibration, shock and changes of temperature.

A still further object is to provide a low cost telescope of the focusing type having novel means which are produced by molding techniques for maintaining all of the component lens members in truly coaxial relation to each other throughout all focusing movements.

Further objects and advantages will be apparent in the details of construction and in the form and arrangements of the parts thereof by reference to the specification herebelow taken in connection with the accompanying drawing.

Figure 1:
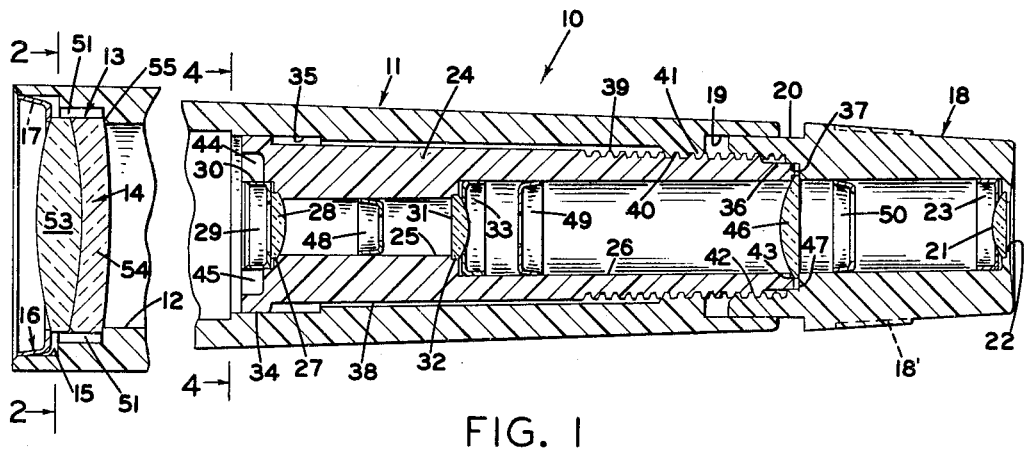
FIG. 1 is a side elevation in section and partly broken away of a telescope constructed according to our invention.

The telescope is generally designated by the numeral 10 in the drawing and is primarily conceived as a low-cost instrument, the principal parts of which are molded preferably from a resinous thermosetting plastic material. In such a telescope, metal parts are eliminated as far as possible along with the relatively costly fitting and adjusting operations.

According to our invention, all of the tubular structures are made of such a plastic material, the principal part being a body tube 11. Extending through a major portion of said body tube 11 is a sight opening 12 which terminates at its forward end in a lens seat 13 whereon a compound objective lens 14 is held as described hereinafter. Between the lens seat 13 and front end of tube 11 is formed an enlarged cylindrical surface 15 on which a lens sealing and retaining ring 16 is seated. An annular spring flange 17 is formed on ring 16 so as to forcibly engage on said surface 15 and enable the ring to bear axially against the lens so as to prevent entrance of foreign matter in the spaces around the lens.

An eyepiece tube 18 is rotatably and slidably journaled in the rear end of the body tube 11 for relative focusing rotational and axial motion thereto by means of a pair of contacting surfaces 19 and 20 which are formed respectively on the body tube and eyepiece tube. In the rear part of the eyepiece tube 18, an eyepiece lens 21 is held on an integrally molded seat 22 by a suitable friction ring 23.

Within the body tube 11 is mounted a focusing tube 24 wherein a central cylindrical opening 25 is formed in tandem to a second cylindrical opening 26. At the front end of the opening 25 a lens seat 27 is formed whereon an erector lens 28 is held by a friction ring 29 which is forced into an accommodating recess 30. At the rear end of the central opening 25, a similar erector lens 31 is held on a lens seat 32 and a similar friction retainer ring 33 is forced into the opening 26 to secure the lens on its seat.

The interior focusing tube 24 is rotatably and slidably journaled within the body tube 11 for focusing movements by means of an enlarged annular bearing surface 34 formed on the forward end of the interior tube. Said bearing surface 34 is slidably fitted within a smooth cylindrical bearing surface 35 which is axially extended to allow for a generous focusing motion. At the opposite end, a short pilot surface 36 is formed which is snugly fitted into an accommodating recess 37 so that the rear end of tube 24 is supported in the eyepiece tube concentrically with respect to the bearing surfaces 19 and 20. A generous clearance 38 is provided between the inside diameter of the body tube 11 and outside diameter of the focusing tube 24 so that the focusing tube is supported only at its opposite ends.

For effecting focusing movements, an extended coarse thread 39 is formed on the rear portion of the focusing tube 24 which engages a female thread 40 formed on an inwardly projecting portion 41 of the body tube 11. The threads 39 and 40 are loosely fitted to each other so that no supporting function is served by this connection between the tubes 11 and 24.

Figure 4:
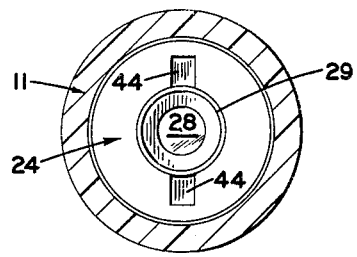
FIG. 4 is a cross-sectional view taken on the line 4—4 of FIG. 1.

A novel feature resides in the fact that an interior thread 42 is formed in the forepart of the eyepiece tube 18 so that it engages the rear portion of the male thread 39. When the threads 39 and 42 are screwed together tightly the thread 39 serves two purposes, i.e., to afford focusing motion and to serve as a connecting means which effectively unite the tubes 24 and 18 so that the focusing screw 39 may be rotated manually by turning the eyepiece tube. A corrugated or knurled structure 18' is provided on the outer surface of the eyepiece tube 18 to assist in rotating said focusing mechanism. For preventing the tube 24 from turning during the thread tightening operation, a pair of spanner wrench recesses 44 and 45 are provided in the front face of the tube wherein a spanner wrench is inserted before assembly of the lens 14 as shown in FIG. 4. A third function of the above-described threaded connection is provided as described hereinbelow.

In the rear face of the tube 24, a suitable lens seat 43 is provided whereon a plano convex eyepiece lens 46 is clamped between the adjacent front face 47 of tube 18 and said lens seat. The seat 47 is constructed square with the axis of the telescope so that the lens 46 is also square thereto and concentricity of the lens is assured by abutting the curved side of the lens against the lens seat.

Suitable field stops 48, 49 and 50 may be provided at selected axial positions within the telescope which are similar in structure to the lens retainers 17, 23, and 29 except as to size and are held in their operative positions in the same manner.

One of the principal novel features of the present invention resides in the mounting mechanism for the objective lens 14, particularly relative to the manner of constructing the aforesaid lens seat 13. The lens seat 13 constitutes an advantageous means for mounting an objective lens 14 in the body tube 11 and said lens may include a plurality of edged elements which are either cemented or uncemented. As shown in FIG. 1 of the drawing, the objective lens 14 comprises two lens elements 53 and 54 which are uncemented and are edged to the same outer diameter.

Figure 2:
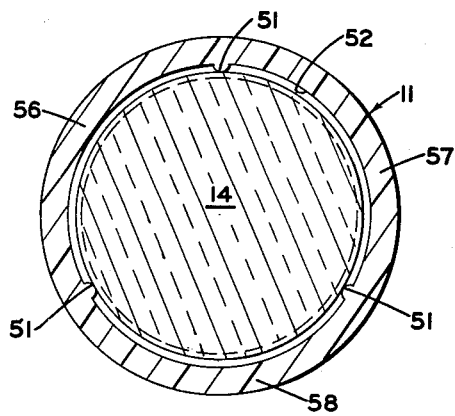
FIG. 2 is a cross-sectional view taken on the line 2—2 of FIG. 1.
Figure 3:
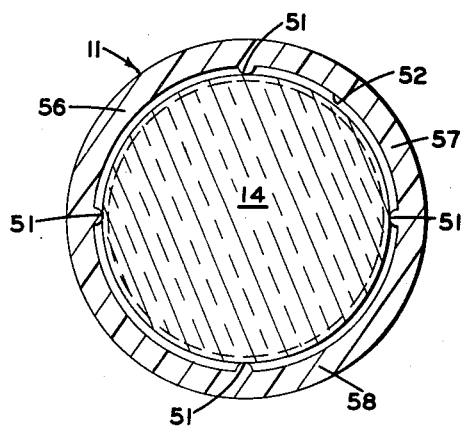
FIG. 3 is a similar view of a modification of the details shown in FIG. 2.

Comprised in said lens seat 13 is a plurality of longitudinal seating ridges 51 which are so formed in the tube 11 as to protrude inwardly from a nominally cylindrical surface 52 as shown in FIGS. 2 and 3. Said ridges 51 preferably extend longitudinally substantially entirely across the edges of the lens elements 53 and 54 but a lesser bearing surface is still sufficient to effectuate this invention. At the rear terminus of the seating ridges 51 is formed a short radial abutment wall 55 against which the lens 14 is held so as to secure good optical alignment thereof with reference to the other parts of the optical system. Substantially only a line contact is made between the edge of the lens 14 and the respective ridges 51, the relative radial dimensions of the contacting surfaces being such as to provide a light press fit therebetween.

The ridge type of lens seat 13 is particularly advantageous for uncemented compound objective lenses since the ridges act simultaneously in several ways to accomplish different functions which are (a) to mechanically align the lens elements 53 and 54 reliably to each other, (b) to centralize the lens elements in the tube 11, and (c) to allow a press fit with tolerances possible with high production methods while maintaining strains induced in the lens elements at an acceptable level over a wide range of ambient temperatures.

To further elucidate the above-mentioned functions, the lens 14 is forced between the ridges 51 with merely sufficient pressure to guarantee that said lens is securely seated thereon and during this operation, the wall segments 56, 57 and 58 having uniform cross-section are actually slightly distorted out of their natural arcuate shape toward a flatter curve. The inherent resiliency of the material of these wall segments 56, 57 and 58 cause the seating ridges 51 to be pressed against the edge of the lens with a firm but gentle pressure throughout all foreseeable changes of temperature of the telescope so that no significant mechanical strains are transmitted to the glass which would appreciably degrade the optical performance of the lens.

In assembling the telescope 10, the erector lenses 28 and 31 together with their respective lens retaining rings 29 and 33 are first assembled in the focusing tube 24 and the tube is held vertical with the spanner recesses 44 and 45 positioned downwardly in engagement with a stationary spanner wrench mechanism. The empty body tube 11 is then screwed into the focusing tube 24 until a short length of the focusing thread 39 is exposed.

After the eyepiece lens 22 and its retainer ring 23 have been assembled in the eyepiece tube 18, the plano-convex lens 46 is placed on the lens seat 43 on the end of tube 24 with the convex surface thereof in contact with said seat. With the eyepiece tube so prepared, the threads 42 thereon are engaged with the threads 39 of tube 24 and the parts are screwed tightly together to clamp the lens 46 in optical alignment with the adjacent lenses and to engage the interfitted parts 36 and 37 for relatively aligning said tubes. The assembly is completed by carefully pressing the lens 14 onto the seating ridges 51 until contact is established with the radial abutment wall 55, the sealing ring 16 being pressed into the recess 15 to cover the spaces underlying the wall segments 56, 57 and 58. Of further importance is the fact that the sealing ring 16 is partly composed of a radial portion which is resilient by reason of the resilient material from which the ring is made. This radial portion is forced in assembly against the lens parts 53 to hold the lens securely against the radial abutment wall 55, thus constituting a second seal against the entrance of foreign matter.

From the foregoing description, it will be perceived that our invention provides a simple, sturdy and low-cost construction for a low-power telescope of the focusing type wherein multipurpose parts are ingeniously designed to serve their stated functions and are used to assure good mechanical and optical alignment of its parts. Although only preferred forms of our invention have been shown and described in detail, other forms are possible and changes may be made in the details of construction of its parts without departing from the spirit of the invention as defined in the claims herebelow appended.

We claim:

1. A telescope comprising a body tube, an eyepeice tube and an interior focusing tube which are molded from an organic plastic material or the like and are coaxially mounted, an optical system therefor cooperatively mounted in said tubes, said system having an eyepiece lens held in said eyepiece tube and a plurality of erector lenses fixed in said interior tube in mutual optical alignment, an interior elongated bearing surface formed in the rear end of said body tube, an exterior elongated bearing surface formed on the front end of said eyepiece tube and having a sliding fit within said interior surface whereby the eyepiece is independently suported in the body tube for focusing movement, means for supporting the front end of said focusing tube for relative rotational and longitudinal motion on the interior surface of said body tube, a focusing thread formed on the outer rear part of said interior tube and extending an axial distance substantially longer than the focusing movement thereof, a mating thread formed on the inner surface of said body tube and loosely fitted to the forward part of said focusing thread, an interior thread formed in the fore part of said eyepiece tube and fitted to receive the rear part of said focusing thread, an interior radial wall formed in the eyepiece tube adjacent to the rear face of said focusing tube, a lens seat formed in said rear face in spaced relation to said radial wall, said wall and seat being urged toward each other by said interior thread to clamp an eyepiece lens therebetween whereby the focusing thread serves three functions which are: to unite the focusing and eyepiece tubes so that the eyepiece tube provides an operating bearing for the focusing tube; to unite the focusing and eyepiece tubes with a torque connection; and to serve as part of the clamping means for holding said eyepiece lens in operative position.

2. A telescope as set forth in claim 1 further characterized by an interior clyindrical surface formed within the fore part of said eyepiece tube concentrically with said exterior bearing surface, an outer cylindrical surface formed on the rear end of said focusing tube and closely fitted into said interior cylindrical surface, the aforesaid lens seat being formed concentrically with said outer cylindrical surface whereby the focusing tube and the lens seat are both concentrically aligned with said bearing surfaces.

References Cited in the file of this patent

UNITED STATES PATENTS

| 1,899,192 | Gaertner | Feb. 28, 1933 |
| 2,130,095 | Langsner | Sept. 13, 1938 |
| 2,155,569 | Trautmann | Apr. 25, 1939 |
| 2,184,352 | Langsner | Dec. 26, 1939 |
| 2,550,962 | Brandon | May 1, 1951 |
| 2,635,289 | Owens | Apr. 21, 1953 |
| 2,776,597 | Burt | Jan. 8, 1957 |
| 2,874,610 | Wright | Feb. 24, 1959 |
| 2,997,916 | Friedman et al. | Aug. 29, 1961 |